(12) United States Patent
Kong et al.

(10) Patent No.: US 9,533,264 B2
(45) Date of Patent: Jan. 3, 2017

(54) COMPOSITE MEMBRANE, METHOD OF MANUFACTURING THE SAME, SEPARATION MEMBRANE INCLUDING THE COMPOSITE MEMBRANE, AND WATER TREATMENT DEVICE USING THE SEPARATION MEMBRANE

(71) Applicant: Samsung Electronics Co., Ltd., Suwon-Si, Gyeonggi-Do (KR)

(72) Inventors: Hye Young Kong, Uijeongbu-si (KR); Bok Soon Kwon, Seoul (KR); Sung Soo Han, Hwaseong-si (KR); Jung Im Han, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 399 days.

(21) Appl. No.: 14/018,976

(22) Filed: Sep. 5, 2013

(65) Prior Publication Data

US 2014/0158612 A1  Jun. 12, 2014

(30) Foreign Application Priority Data

Dec. 6, 2012 (KR) .......................... 10-2012-0141380

(51) Int. Cl.
*B01D 39/00* (2006.01)
*B01D 39/14* (2006.01)
(Continued)

(52) U.S. Cl.
CPC ......... *B01D 69/148* (2013.01); *B01D 67/0011* (2013.01); *B01D 67/0079* (2013.01);
(Continued)

(58) Field of Classification Search
CPC ......... B01D 69/08; B01D 69/02; B01D 71/34; B01D 71/68; B01D 2323/21; B01D 2325/36; B01D 69/148; B01D 71/024
(Continued)

(56) References Cited

U.S. PATENT DOCUMENTS 4,890,435 A * 1/1990 Wilkening ............... E06B 3/685
52/456
5,273,657 A * 12/1993 Nakashima ............ B01D 71/66
210/500.41
(Continued)

FOREIGN PATENT DOCUMENTS

CN    101407997 A    4/2009
JP    2008045124 A   2/2008
(Continued)

OTHER PUBLICATIONS

Julian S. Taurozzi et al., Effect of filler incorporation route on the properties of polysulfone-silver nanocomposite membranes of diffeent porosities; Journal of Membrane Science 325 (2008) 58-68.*
(Continued)

*Primary Examiner* — Ana Fortuna
(74) *Attorney, Agent, or Firm* — Harness, Dickey & Pierce P.L.C.

(57) ABSTRACT

An organic/inorganic composite membrane may include hydrophilic inorganic particles dispersed in an organic polymer matrix having finger-like pores. The hydrophilic inorganic particles may be present at a higher concentration near one surface of the membrane having a higher density than the other surface of the membrane having a lower density.

19 Claims, 12 Drawing Sheets

(51) Int. Cl.
| | |
|---|---|
| *B01D 24/00* | (2006.01) |
| *B01D 67/00* | (2006.01) |
| *B01D 69/14* | (2006.01) |
| *B29D 99/00* | (2010.01) |
| *B01D 61/00* | (2006.01) |
| *B01D 61/02* | (2006.01) |

(52) U.S. Cl.
CPC .......... *B29D 99/005* (2013.01); *B01D 61/002* (2013.01); *B01D 61/025* (2013.01)

(58) Field of Classification Search
USPC .. 210/502.1, 500.27–500.53, 500.25; 264/49
See application file for complete search history.

(56) References Cited

U.S. PATENT DOCUMENTS

| | | | | |
|---|---|---|---|---|
| 5,766,760 | A * | 6/1998 | Tsai | D01D 5/247 428/372 |
| 6,500,233 | B1 * | 12/2002 | Miller | B01D 53/228 210/640 |
| 7,358,288 | B2 | 4/2008 | Kerres | |
| 7,374,679 | B2 * | 5/2008 | Huang | B01D 39/1692 210/500.27 |
| 7,387,732 | B2 | 6/2008 | Kerres et al. | |
| 7,652,089 | B2 | 1/2010 | Choi et al. | |
| 7,897,430 | B2 | 3/2011 | Kim et al. | |
| 7,988,896 | B2 | 8/2011 | Zhang et al. | |
| 8,071,006 | B2 * | 12/2011 | Thottupurathu | B01D 53/228 210/500.36 |
| 8,168,705 | B2 | 5/2012 | Kerres | |
| 8,409,746 | B2 | 4/2013 | Yong et al. | |
| 8,435,631 | B2 * | 5/2013 | Boyer | A61L 9/042 239/53 |
| 9,004,293 | B2 * | 4/2015 | Son | B01D 67/0079 210/500.21 |
| 9,005,496 | B2 * | 4/2015 | Liang | B01D 67/0013 210/490 |
| 9,211,506 | B2 * | 12/2015 | Shih | B01D 67/0016 |
| 2004/0101760 | A1 | 5/2004 | Kerres et al. | |
| 2004/0106044 | A1 | 6/2004 | Kerres | |
| 2006/0032813 | A1 * | 2/2006 | Ieraci | B01D 67/0086 210/500.36 |
| 2006/0096913 | A1 | 5/2006 | Kerres et al. | |
| 2008/0145570 | A1 | 6/2008 | Zhang et al. | |
| 2008/0318134 | A1 | 12/2008 | Kerres | |
| 2009/0224234 | A1 | 9/2009 | Kim et al. | |
| 2009/0272692 | A1 | 11/2009 | Kurth et al. | |
| 2009/0305871 | A1 * | 12/2009 | Perera | B01D 69/02 502/60 |
| 2010/0018394 | A1 * | 1/2010 | Ekiner | B01D 53/228 95/54 |
| 2010/0288122 | A1 | 11/2010 | Liu et al. | |
| 2010/0305289 | A1 | 12/2010 | Jiang | |
| 2010/0326273 | A1 | 12/2010 | Liu et al. | |
| 2011/0027691 | A1 | 2/2011 | Kerres | |
| 2011/0186506 | A1 * | 8/2011 | Ratto | B01D 71/06 210/499 |
| 2011/0281150 | A1 | 11/2011 | Yong et al. | |
| 2011/0281171 | A1 | 11/2011 | Yong et al. | |
| 2011/0281172 | A1 | 11/2011 | Yong et al. | |
| 2012/0055867 | A1 * | 3/2012 | Shih | B01D 67/0016 210/500.25 |
| 2012/0085698 | A1 * | 4/2012 | Yang | B01D 69/087 210/500.23 |
| 2013/0277300 | A1 * | 10/2013 | Nunes | B01D 69/02 210/500.25 |
| 2014/0158612 | A1 * | 6/2014 | Kong | B29D 99/005 210/500.25 |
| 2014/0319049 | A1 * | 10/2014 | Tang | B01D 69/12 210/489 |
| 2015/0053607 | A1 * | 2/2015 | Liu | B01D 71/68 210/500.3 |
| 2015/0053610 | A1 * | 2/2015 | Diallo | B01D 67/0079 210/500.23 |
| 2015/0129496 | A1 * | 5/2015 | Sanguineti | B01D 69/12 210/640 |

FOREIGN PATENT DOCUMENTS

| | | |
|---|---|---|
| JP | 2009269986 A | 11/2009 |
| JP | 2011168785 A | 9/2011 |
| KR | 20030015233 | 2/2003 |
| KR | 20030016253 | 2/2003 |
| KR | 20050022744 A | 3/2005 |
| KR | 20060050976 A | 5/2006 |
| KR | 0611682 | 8/2006 |
| KR | 0708489 | 4/2007 |
| KR | 0837071 | 6/2008 |
| KR | 20090082941 A | 8/2009 |
| KR | 20110103068 A | 9/2011 |
| KR | 20110134546 A | 12/2011 |

OTHER PUBLICATIONS

Mei Ling Chua et al., "Polyetheramine-Polyhedral Oligomeric Silsesquioxane Organic-Inorganic Hybrid Membranes for CO2/H2 and CO2/N2 Separation" Journal of Membrane Science vol. 385 Issue: 1-2 pp. 40-48 DOI: 10.1016/j.memsci.2011.09.008 Published: Dec. 1, 2011.

Chemical Journal of Chinese Universities—Chinese vol. 32 Issue: 1 pp. 10-15 Published: Jan. 10, 2011.

Suresh M. Kumbar et al., "Ormocers (Organic-Inorganic Hybrid Copolymers)—Zeolite Beta (BEA) Nanocomposite Membranes for Gas Separation Applications" Journal of Membrane Science vol. 347 Issue: 1-2 pp. 132-140 DOI: 10.1016/j.memsci.2009.10.014 Published: Feb. 1, 2010.

Chunlonag Kong et al., "Enhanced Performance of Inorganic-Polyamide Nanocomposite Membranes Prepared by Metal-Alkoxide-Assisted Interfacial Polymerization" Journal of Membrane Science 366 (2011) 382-388.

* cited by examiner

COMPOSITE MEMBRANE, METHOD OF MANUFACTURING THE SAME, SEPARATION MEMBRANE INCLUDING THE COMPOSITE MEMBRANE, AND WATER TREATMENT DEVICE USING THE SEPARATION MEMBRANE

CROSS-REFERENCE TO RELATED APPLICATION

This application claims priority under 35 U.S.C. §119 to Korean Patent Application No. 10-2012-0141380, filed in the Korean Intellectual Property Office on Dec. 6, 2012, the entire contents of which are incorporated herein by reference.

BACKGROUND

1. Field

Example embodiments relate to a separation membrane, a method of manufacturing the same, and a water treatment device including the same.

2. Description of the Related Art

There has been growing interest in forward osmosis (FO) technology with an increasing demand for the development of a separation membrane having a higher efficiency but lower energy consumption.

Forward osmosis, like reverse osmosis, requires a semi-permeable membrane that is capable of filtering an osmotic pressure-drawing solute. However, forward osmosis uses a concentration difference instead of a pressure difference in order to separate materials, unlike reverse osmosis. Thus, a forward osmosis process may be operated under a relatively low pressure or even without any pressure.

On the contrary, a reverse osmosis process is operated by using a separation membrane (e.g., for filtering salt or foreign particles) that is laminated on a support layer that can endure a relatively high pressure, since water is separated from the unwanted substances with pressure. However, since the forward osmosis process separates unwanted substances from water using diffusion according to an osmotic pressure (rather than by directly applying pressure), a support layer may have hydrophilicity as well as porosity or tortuosity, thickness, and the like, so that the support layer may help with the water diffusion. A more hydrophilic, thinner, and more porous support layer has been reported to improve permeability of a separation membrane.

SUMMARY

Some embodiments relate to an organic/inorganic composite membrane having improved hydrophilicity and mechanical strength.

Some embodiments relate to a method of manufacturing the organic/inorganic composite membrane.

Some embodiments relate to a separation membrane including the organic/inorganic composite membrane.

Some embodiments relate to a method of manufacturing the separation membrane.

Some embodiments relate to a water treatment device including the separation membrane.

An organic/inorganic composite membrane may include hydrophilic inorganic particles dispersed in an organic polymer matrix having finger-like pores, wherein the inorganic particles are dispersed in a higher concentration in one side (e.g., first surface) of the membrane than the other side (e.g., opposing second surface) of the membrane. Specifically, the organic/inorganic composite membrane may have the hydrophilic inorganic particles in a higher concentration near one surface (e.g., first surface) of the membrane having a higher density than the other surface (e.g., opposing second surface) of the membrane having a lower density.

More specifically, the organic/inorganic composite membrane has a higher inorganic particle concentration from the surface having a higher density to a depth of about 0.0005% to about 0.05% in a thickness direction than from the other surface having a lower density to a depth of about 0.0005% to about 0.05% in a thickness direction.

For example, the hydrophilic inorganic particle concentration to a depth of about 0.0005% to about 0.05% in a thickness direction of the surface having a higher density may be more than about 1 time, specifically at least about 2 times, more specifically at least about 2.5 times, and much more specifically at least about 3 times as high as a concentration to a depth of about 0.0005% to about 0.05% of the other surface having a lower density.

On the other hand, the organic polymer matrix may include any organic polymer for forming a support layer of a separation membrane for water treatment.

For example, the polymer may be an aryl backbone polymer such as polysulfone, polyethersulfone, polyphenylsulfone, polyetherethersulfone, polyetherketone, polyetheretherketone, polyphenylene ether, polydiphenylphenylene ether, or polyphenylene sulfide, or cellulose acetate, cellulose diacetate, or cellulose triacetate, but is not limited thereto.

In addition, the inorganic particles in the membrane may be an oxide and/or hydroxide of Ti, Al, Zr, Si, Sn, B, and/or Ce.

The inorganic particles may have an average particle size of less than or equal to about 20 nm, specifically, less than or equal to about 15 nm, and more specifically, less than or equal to about 10 nm.

The inorganic particles may be included in an amount of about 0.1 wt % to about 20.0 wt %, for example, about 0.5 wt % to about 15.0 wt %, and specifically, about 1 wt % to about 10 wt %, based on the total weight of the membrane.

A method of manufacturing the organic/inorganic composite membrane including the hydrophilic inorganic particles dispersed in an organic polymer matrix may include casting an organic polymer solution including a hydrophilic inorganic particle precursor on a supporter, and treating the cast supporter in a non-solvent phase inversion method.

Specifically, the method may be performed by dissolving an organic polymer and the hydrophilic inorganic particle precursor in an organic solvent, casting the solution on a supporter, and immediately dipping the cast supporter in water to apply non-solvent phase inversion thereto to simultaneously form an organic polymer matrix with hydrophilic inorganic particles dispersed therein.

The precursor of the hydrophilic inorganic particles may be a compound being capable of forming the inorganic particles through hydrolysis when it contacts water, and for example, a compound that forms an oxide and/or hydroxide of a Ti, Al, Zr, Si, Sn, B, and/or Ce element and that may be an alkoxide, ester, acetylacetonate, halide, or nitride of the element.

The organic solvent dissolving the organic polymer and the hydrophilic inorganic particles may be one or more organic solvent selected from acetone; acids such as acetic acid, trifluoroacetic acid (TFA), and the like; alcohols such as methanol, isopropanol, 1-methoxy-2-propanol, ethanol, terpineol, and the like; oxygen-containing cyclic compounds such as tetrahydrofuran (THF), 1,4-dioxane, or sulfolane, and the like; aromatic compounds including a heteroatom of N, O, or S such as pyridine and the like; halogen compounds such as chloroform, methylene chloride, and the like; aprotic polar compounds such as dimethyl formamide (DMF), dimethyl acetamide (DMAC), dimethylsulfoxide (DMSO), N-methyl-2-pyrrolidone (NMP), and the like; and acetates such as 2-butoxyethylacetate, 2(2-butoxyethoxy)ethylacetate, and the like; but is not limited thereto.

The organic polymer may be used for forming a support layer of a separation membrane for water treatment as described above.

According to the method, the organic/inorganic composite membrane includes hydrophilic inorganic particles dispersed in an organic polymer matrix having finger-like pores. In particular, the hydrophilic inorganic particles are present in a relatively high concentration on one surface having a higher density and in a relatively low concentration on the other surface having a lower density.

Furthermore, the hydrophilic inorganic particles in the organic/inorganic composite membrane may have an average uniform particle size of less than or equal to about 20 nm, specifically less than or equal to about 15 nm, and more specifically less than or equal to about 10 nm, which indicates that the particles are not agglomerated in the organic polymer matrix but are uniformly dispersed therein.

According to another example embodiment, a separation membrane for water treatment may include the organic/inorganic composite membrane.

Specifically, the separation membrane for water treatment includes the organic/inorganic composite membrane as a support layer and an active layer for filtering foreign particles disposed on the surface having a higher density in the organic/inorganic composite membrane.

The active layer is semi-permeable, that is, it permeates water but does not permeate a subject material to be separated, and may additionally include a polymer matrix.

The polymer matrix forming the active layer may include an aryl backbone polymer such as a polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylidene fluoride, polyvinylchloride, polyphenylene sulfide, and the liker, or a cellulose acetate, cellulose diacetate, or cellulose triacetate, but is not limited thereto.

According to another example embodiment, a method of manufacturing the separation membrane is discussed in further detail herein.

Specifically, the separation membrane may be fabricated by polymerizing an active layer formed of a polymer matrix through interface polymerization on the surface having a higher density of the organic/inorganic composite membrane.

According to a further example embodiment, a water treatment device may include the separation membrane.

The water treatment device may be a forward osmosis water treatment device or a reverse osmosis water treatment device.

DETAILED DESCRIPTION

Figure 1:
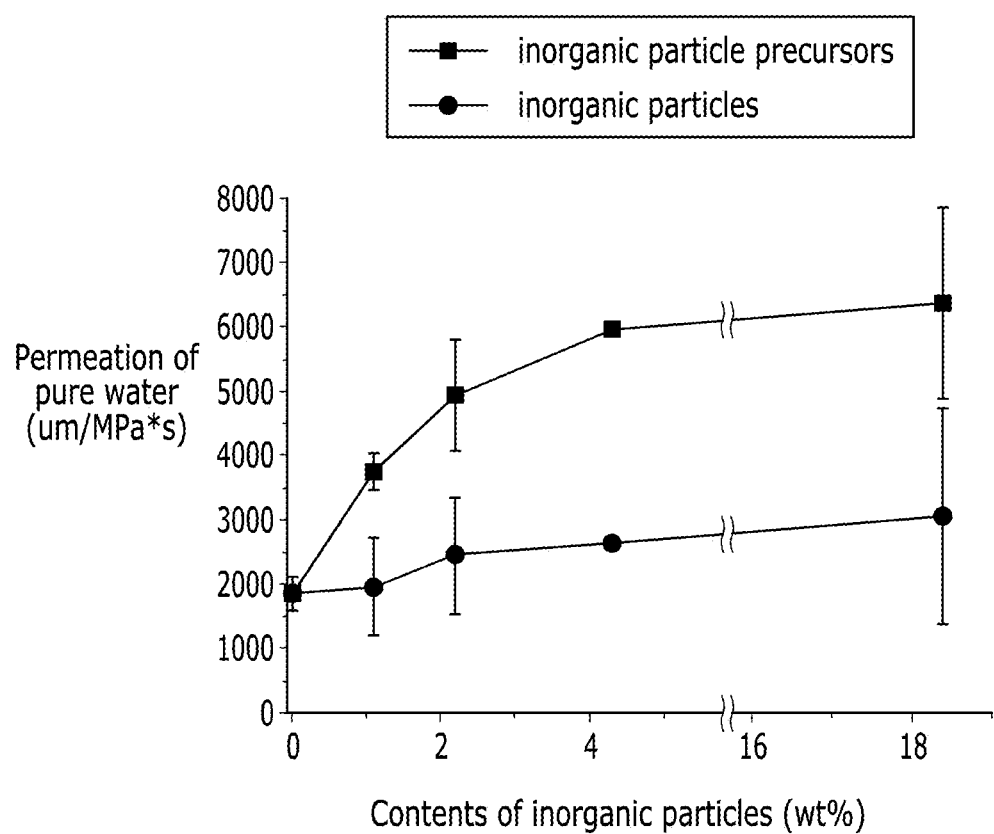
FIG. 1 is a graph showing a comparison of the pure water permeability of an organic/inorganic composite membrane fabricated by using titanium tetraisopropoxide as an inorganic particle precursor according to Experimental Example 1 and another organic/inorganic composite membrane fabricated by using titanium oxide as an inorganic particle depending on the amount of an inorganic particle (for example, titanium oxide).

This disclosure will be described more fully hereinafter in the following detailed description, in which some example embodiments of this disclosure are described. This disclosure may be embodied in many different forms and is not to be construed as limited to the example embodiments.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to one example embodiment, an organic/inorganic composite membrane including hydrophilic inorganic particles dispersed in an organic polymer matrix having finger-like pores is provided. The inorganic particles are included in a higher concentration in one side (e.g., first surface) of the membrane than the other side (e.g., opposing second surface) of the membrane.

Specifically, the organic/inorganic composite membrane may include the hydrophilic inorganic particles in a higher concentration near one surface (e.g., first surface) having a higher density of the membrane than the other surface (e.g., opposing second surface) having a lower density. The lower density side of the membrane may be more porous than the higher density side. The concentration of the hydrophilic inorganic particles may gradually increase from the lower density surface to the higher density surface.

The organic/inorganic composite membrane may be fabricated in a non-solvent phase inversion method as described in more detail in the following. The non-solvent phase inversion forms finger-like pores in the organic/inorganic composite membrane in a thickness direction. In addition, the organic/inorganic composite membrane has regions respectively having higher and lower organic polymer densities in a thickness direction. Accordingly, the organic/inorganic composite membrane has surface regions having a higher density and a lower density. Herein, the region having a higher density includes inorganic particles in a higher hydrophilic concentration than the other surface region having a lower density.

For example, the organic/inorganic composite membrane may have a higher inorganic particle concentration from the surface having a higher density to a depth of about 0.0005% to about 0.05% of the overall thickness than the other surface having a lower density to a depth of about 0.0005% to about 0.05% of the overall thickness.

Furthermore, the organic/inorganic composite membrane has more than about 1 time, specifically at least about 2 times, more specifically at least about 2.5 times, and much more specifically at least about 3 times as high an inorganic particle concentration from the surface having a higher density to a depth of about 0.0005% to about 0.05% of the overall thickness as that of the other surface having a lower density to a depth of about 0.0005% to about 0.05% of the overall thickness.

When the membrane is fabricated in the non-solvent phase inversion method, the membrane may be about 50 µm to about 150 µm thick, specifically, about 70 µm to about 130 µm thick, and more specifically, about 80 µm to about 120 µm thick. Accordingly, the depth of about 0.0005% to about 0.05% of the overall thickness from both surfaces of the membrane may be about 5 nm to about 30 nm thick, specifically, about 5 nm to about 20 nm thick, and more specifically, about 5 nm to about 10 nm thick.

The organic polymer matrix includes a polymer which may be any organic polymer for forming a support layer of a separation membrane for water treatment, and specifically, may be an aryl backbone polymer such as polysulfone, polyethersulfone, polyphenylsulfone, polyetherethersulfone, polyetherketone, polyetheretherketone, polyphenylene ether, polydiphenylphenylene ether, or polyphenylene sulfide, or cellulose acetate, cellulose diacetate, or cellulose triacetate, and the like, but is not limited thereto.

The inorganic particles may be an oxide and/or hydroxide of Ti, Al, Zr, Si, Sn, B, and/or Ce.

The inorganic particles may have an average particle size of less than or equal to about 20 nm, specifically, less than or equal to about 15 nm, and more specifically, less than or equal to about 10 nm.

The inorganic particles may be included in an amount of about 0.1 wt % to about 20.0 wt %, for example, about 0.5 wt % to about 15.0 wt %, and specifically, about 1 wt % to about 10 wt % based on the total weight of the membrane.

The inorganic particles have been composited with an organic polymer in order to increase hydrophilicity and mechanical strength of the membrane. The composite method includes dispersing the inorganic particles into a polymer solution and treating the composite solution in a non-solvent phase inversion method to form a composite layer. However, since the hydrophilic inorganic particles may be difficult to disperse into the organic solvent in the method, it may be beneficial for the inorganic particles to be treated with an oil-based material or additionally sonicated with ultrasonic waves to facilitate or increase the dispersion.

Despite the additional treatment, the inorganic particles may not be evenly dispersed into the polymer but may be agglomerated in the organic/inorganic composite membrane, and also they may be mainly present on the surface having a lower density due to the weight. Accordingly, the organic/inorganic composite membrane does not have sufficient hydrophilic effects.

According to one example embodiment, an organic/inorganic composite membrane including inorganic particles that are not agglomerated but uniformly dispersed into an organic polymer matrix is provided, and in particular, having a higher inorganic particle concentration on the surface having a higher density than the other surface having a lower density.

The terms "concentration" and "dispersion" of the inorganic particles are explained as follows.

The "dispersion of the inorganic particles" means that the inorganic particles are not agglomerated but are separately present in the membrane. The reason is that inorganic particle precursors (rather than the inorganic particles) are first evenly dispersed and then form inorganic particles, and simultaneously a membrane is formed before the inorganic particles that are heavier than the inorganic particle precursors are agglomerated. As post-described in Experimental Example 3, the "dispersion" of the inorganic particles in the organic/inorganic composite membrane is identified using a transmission electron microscope.

On the other hand, the "concentration of the inorganic particles" in the membrane indicates a degree at which the inorganic particles are present in a particular region in the membrane, as aforementioned. For example, the inorganic particle concentration is higher near the surface having a higher density of the membrane than the other surface having a lower density of the membrane. As post-described in Experimental Example 5, the inorganic particles are not agglomerated but are evenly dispersed when measured using energy dispersive X-ray spectroscopy (EDAX). During the fabrication of the membrane in a non-solvent phase inversion method, the inorganic particle precursors move with polymers for forming the membrane and are inverted into inorganic particles. Accordingly, the inorganic particles have a higher concentration near the surface having a higher density than the other surface having a lower density.

Particularly, when the organic/inorganic composite membrane having the dispersion and concentration of inorganic particles is used as a separation membrane for water treatment, the surface having a higher concentration of hydrophilic inorganic particles may be used as an active layer, or an additional active layer may be disposed on the surface having a higher concentration of hydrophilic inorganic particles in order to increase hydrophilicity and have an effect on increasing the permeation amount of water. In addition, the hydrophilic inorganic particles are not agglomerated but are uniformly dispersed in the membrane, and further, may increase the hydrophilic effects thereof. The organic/inorganic composite membrane may be fabricated in a method according to another example embodiment.

Specifically, the method of manufacturing the organic/inorganic composite membrane according to an example embodiment may include mixing an inorganic particle precursor with a solution in which an organic polymer is dissolved rather than directly dispersing inorganic particles into a polymer solution.

More specifically, the method of manufacturing the organic/inorganic composite membrane according to an example embodiment includes dissolving an organic polymer in an organic solvent, dissolving an inorganic particle precursor compound in the solution, casting the resulting solution to have a predetermined thickness on a supporter, and dipping the cast supporter in water at room temperature to apply a non-solvent phase inversion thereto.

The non-solvent phase inversion forms an organic polymer matrix, and simultaneously forms and disperses hydrophilic inorganic particles therein to form an organic/inorganic composite membrane.

The hydrophilic inorganic particle precursor contacts water and thus may be hydrolyzed to form the inorganic particles, for example, an oxide and/or hydroxide of a Ti, Al, Zr, Si, Sn, B, and/or Ce element, and they may be an alkoxide, ester, acetylacetonate, halide, or nitride of the element.

The organic polymer may be any organic polymer for forming a support layer of a separation membrane for water treatment, and specifically, may be an aryl backbone polymer such as polysulfone, polyethersulfone, polyphenylsulfone, polyetherethersulfone, polyetherketone, polyetheretherketone, polyphenylene ether, polydiphenylphenylene ether, or polyphenylene sulfide, or cellulose acetate, cellulose diacetate, or cellulose triacetate, and the like, but is not limited thereto.

The organic solvent dissolving the organic polymer and the hydrophilic inorganic particles may be one or more organic solvents selected from acetone; acids such as acetic acid, trifluoroacetic acid (TFA), and the like; alcohols such as methanol, isopropanol, 1-methoxy-2-propanol, ethanol, terpineol, and the like; oxygen-containing cyclic compounds such as tetrahydrofuran (THF), 1,4-dioxane, sulfolane, and the like; aromatic compounds including a heteroatom of N, O, or S such as pyridine, and the like; halogen compounds such as chloroform, methylene chloride, and the like; aprotic polar compounds such as dimethyl formamide (DMF), dimethyl acetamide (DMAC), dimethyl sulfoxide (DMSO), N-methyl-2-pyrrolidone (NMP), and the like; acetates such as 2-butoxyethylacetate, 2(2-butoxyethoxy)ethylacetate, and the like; but is not limited thereto.

The organic/inorganic composite membrane manufactured according to the method includes hydrophilic inorganic particles dispersed in an organic polymer matrix having finger-like pores, and particularly, has a higher concentration of the hydrophilic inorganic particles near the surface having a higher density than the other surface having a lower density.

Furthermore, the hydrophilic inorganic particles in the organic/inorganic composite membrane may have an average uniform particle size of less than or equal to about 20 nm, specifically, less than or equal to about 15 nm, and more specifically, less than or equal to about 10 nm, which indicates the particles are not agglomerated in the organic polymer matrix but are uniformly dispersed therein.

In this way, when the hydrophilic inorganic particles are uniformly dispersed in an organic polymer matrix in the organic/inorganic composite membrane, the organic/inorganic composite membrane may become much more hydrophilic. In addition, the hydrophilic inorganic particles have a higher concentration near the surface having a higher density than the other surface having a lower density, and thus may accomplish higher water permeability when used as a separation membrane for water treatment.

According to yet another example embodiment, a separation membrane for water treatment including the organic/inorganic composite membrane is provided.

Specifically, the organic/inorganic composite membrane may be used as a support layer of the separation membrane for water treatment, and may provide a separation membrane for water treatment further including an active layer to separate foreign particles on the surface having a higher density of the organic/inorganic composite membrane.

The active layer permeates water but does not permeate a subject material to be separated, and may include a polymer matrix.

The polymer matrix may include an aryl backbone polymer such as polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylidene fluoride, polyvinyl chloride, and the like, or cellulose acetate, cellulose diacetate, or cellulose triacetate, without limitation.

According to still another example embodiment, a method of manufacturing the separation membrane is provided.

Specifically, the separation membrane may be fabricated by polymerizing the active layer including a polymer matrix through interface polymerization on the surface having a higher density of the organic/inorganic composite membrane.

As aforementioned, the separation membrane for water treatment includes the organic/inorganic composite membrane according to one example embodiment and the active layer disposed on the surface having a higher density through interface polymerization, and thus may have further improved water permeability. A conventional separation membrane including an organic/inorganic composite membrane fabricated by directly mixing inorganic particles with a polymer organic solution includes the inorganic particles in a higher concentration on the surface having a lower density than the other surface having a higher density. Accordingly, since the active layer is formed on the surface having a higher density through interface polymerization, the organic/inorganic composite membrane may not improve water permeability of the separation membrane.

According to a further example embodiment, a water treatment device including the separation membrane is provided.

The water treatment device may be a forward osmosis water treatment device or a reverse osmosis water treatment device. For example, the separation membrane may be applied to a separation membrane of a forward osmosis water treatment device.

According to one example embodiment, the forward osmosis water treatment device includes a first housing including a receiving part for a feed solution including a subject material to be separated, a receiving part for an osmosis draw solution having a higher osmotic pressure concentration than the feed solution and a separation membrane disposed between the receiving part for a feed solution and the receiving part for an osmosis draw solution; a second housing for storing the osmosis draw solution in order to supply the osmosis draw solution to the first housing and to recover the osmosis draw solution from the housing; and a recovery unit for separating and recovering an osmosis draw solute of the osmosis draw solution, wherein the separation membrane includes, as a support layer, an organic/inorganic composite membrane including hydrophilic inorganic particles dispersed in an organic polymer matrix having finger-like pores where a concentration of the inorganic particles at one surface of the membrane is higher than that at the other surface of the membrane, and further includes an active layer of an interface polymerized polymer matrix on a surface having a relatively higher concentration of the inorganic particles in the organic/inorganic composite membrane.

The forward osmosis water treatment device may further include a device discharging the resultant as treated water after separating the osmosis draw solute from the osmosis draw solution including water passing the separation membrane from the feed solution due to osmotic pressure through the recovery unit.

The forward osmosis water treatment device may have the same separation membrane and active layer as aforementioned, and thus will not be discussed in additional detail.

The feed solution may include sea water, brackish water, waste water, tap water for drinking water processing, and the like.

For example, the forward osmosis device may be used for water purification, waste water treatment and reuse, sea water desalination, and the like.

The forward osmosis water treatment device may use a separation membrane including an organic/inorganic composite membrane having increased hydrophilicity and mechanical strength, and may accomplish water permeability and higher energy efficiency.

Hereinafter, several example embodiments are illustrated in more detail below. However, it should be understood that the following are merely examples and are not intended to limit the present disclosure.

EXAMPLES

Example 1

Manufacture of Organic/Inorganic Composite Membrane

Using Inorganic Particle Precursor

A polysulfone (molecular weight: 35,000) polymer and lithium chloride as a pore formation agent are dissolved in N-methyl-2-pyrrolidinone as an organic solvent through mechanical agitation. When the polysulfone and the lithium chloride are completely dissolved, titanium tetraisopropoxide as a titanium oxide precursor is injected into the agitated solution. The mixture is mechanically agitated to mix the precursor material and the polymer solution. Herein, the titanium tetraisopropoxide is included so that the titanium oxide may be included in a concentration of about 2.2 wt % in an organic polymer matrix. The inorganic precursor-polymer mixed solution is cast to be 200 μm thick on a glass substrate, and then immediately dipped in water at room temperature as a non-solvent and allowed to stand for greater than or equal to about 10 minutes to form a membrane and inorganic particles. When the reaction is complete, the obtained organic/inorganic composite membrane is washed in flowing water to completely remove an unreacted material and an organic solvent therein.

Example 2

Manufacture of Organic/Inorganic Composite Membrane Using Inorganic Particle Precursor An organic/inorganic composite membrane including inorganic titanium oxide particles dispersed in a polysulfone polymer matrix is fabricated according to the same method as Example 1, except for using a cosolvent prepared by mixing dimethyl formamide and N-methyl-2-pyrrolidinone in a weight ratio of 3:1 without adding a pore forming agent.

Example 3

Manufacture of Organic/Inorganic Composite Membrane Using Inorganic Particle Precursor An organic/inorganic composite membrane including inorganic silicon dioxide particles dispersed in a polysulfone polymer matrix is fabricated according to the same method as Example 2 by adding about 2.2 wt % of a silicon dioxide precursor, tetraethyl orthosilicate, instead of a titanium oxide precursor as an inorganic precursor into an organic polymer matrix.

Example 4

Manufacture of Organic/Inorganic Composite Membrane Using Inorganic Particle Precursor An organic/inorganic composite membrane including inorganic titanium oxide particles dispersed in a polysulfone polymer matrix is fabricated according to the same method as Example 1 by dissolving cellulose acetate as an organic polymer in N-methyl-2-pyrrolidinone as an organic solvent through mechanical agitation.

Example 5

Manufacture of Organic/Inorganic Composite Membrane Using Inorganic Particle Precursor An organic/inorganic composite membrane including inorganic titanium oxide particles dispersed in a polysulfone polymer matrix is fabricated according to the same method as Example 1 by dissolving polyethersulfone as an organic polymer in N-methyl-2-pyrrolidinone as an organic solvent through mechanical agitation.

Example 6

Manufacture of Organic/Inorganic Composite Membrane Using Inorganic Particle Precursor An organic/inorganic composite membrane including inorganic particles dispersed in a polysulfone polymer matrix is fabricated by casting a mixed solution of a polymer solution and an inorganic precursor prepared according to the same method as Example 2 to be 150 μm-thick on a non-woven fabric on a glass substrate, dipping the coated non-woven fabric in water, a non-solvent, at room temperature and allowing it to stand for greater than or equal to 10 minutes to format a membrane and inorganic particles.

Comparative Example 1

Manufacture of Organic/Inorganic Composite Membrane Using Inorganic Particles

An organic/inorganic composite membrane is fabricated according to the same method as Example 2, except for adding about 2.2 wt % of titanium oxide particles, Degussa P25 nanoparticles, instead of the inorganic precursor, to an organic polymer matrix, and performing ultra-sonication to evenly disperse the inorganic particles in the polymer solution.

Comparative Example 2

Manufacture of Membrane Including No Inorganic Particles as Control Group

In order to compare performance of the membranes according to the examples and comparative examples, a polysulfone membrane including no inorganic additive is fabricated. The polysulfone membrane is fabricated according to the same method as Example 1, except for including no inorganic precursor.

Experimental Example 1

Performance Comparison of Organic/Inorganic Composite Membrane and Polymer Membrane In order to compare membranes, a polysulfone solution (with a molecular weight of about 35,000) is dissolved in a cosolvent prepared by mixing dimethyl formamide and N-methyl-2-pyrrolidone in a weight ratio of 3:1, and titanium tetraisopropoxide as a titanium oxide precursor is added thereto. Herein, the titanium tetraisopropoxide is used in an amount of 2.2 wt % of titanium oxide dispersed in an organic polymer matrix. On the other hand, a membrane film including no inorganic particles as a control group is fabricated by initially preparing a polysulfone solution. Each of the two solutions, one of which including the titanium tetraisopropoxide and the other including no inorganic particle precursor, is coated on a glass substrate and dried in a 60° C. oven for about 24 hours. Then, the coated glass substrates are slowly heated up to 80° C., 100° C., and 120° C. in order at intervals of 2 to 4 hours, and dried under vacuum at 120° C. for about 24 hours to completely remove the organic solvent therein, fabricating compressed films having almost no porosity. The compressed films are cleaned with flowing water and dried in a 100° C. oven for greater than or equal to 12 hours, weighed, and then dipped in water again and allowed to stand for greater than or equal to 12 hours, and weighed again in order to measure water uptake based on a weight difference before and after being dipped in water.

The compressed films are dried and then evaluated regarding contact angle with a contact angle measurement device in a Cessile drop method in order to examine hydrophilicity change depending on an organic/inorganic composite, and measured regarding tensile strength with a tensile strength measurement device in order to measure mechanical strength after measuring the thickness and width of the films.

The water uptake, contact angle, and tensile strength results are provided in the following Table 1.

TABLE 1

|  | Contact angle (°) | Water uptake (%) | Tensile strength (MPa) |
| --- | --- | --- | --- |
| Organic/inorganic composite membrane | 67 | 3.82 | 90.34 |
| Organic membrane | 82 | 1.48 | 84.32 |

As shown in Table 1, the organic/inorganic composite membrane including an inorganic particle precursor has a smaller contact angle, higher water uptake, and better tensile strength than the polymer membrane including no inorganic particles. In other words, the organic/inorganic composite membrane according to one example embodiment became more hydrophilic and thus has better water uptake and also remarkably improved mechanical strength due to inorganic particles combined therein.

Experimental Example 2

Comparison of Pure Water Permeability Performance of Organic/Inorganic Composite Membrane An organic/inorganic composite membrane is fabricated according to the same method as Example 2. Specifically, a polysulfone polymer (with a molecular weight of about 35,000) is dissolved in a cosolvent prepared by mixing dimethyl formamide and N-methylpyrrolidone in a weight ratio of 3:1, and titanium tetraisopropoxide as a titanium oxide precursor or titanium oxide (Degussa P25) particles is dissolved in the polymer solution. Herein, the titanium tetraisopropoxide and the titanium oxide are respectively used, so that titanium oxide is dispersed in an organic polymer matrix in an amount of about 1.1 wt %, about 2.2 wt %, about 4.3 wt %, and about 18.4 wt %. These solutions are respectively cast and coated on a glass substrate and allowed to stand in water for greater than or equal to about 10 minutes, fabricating an organic/inorganic composite membrane in a non-solvent phase inversion method.

The membranes are measured regarding the amount of pure water permeated through a dead-end cell for a predetermined time by changing a pressure to measure pure water permeability depending on each inorganic amount.

The pure water permeability results depending on the amount of titanium oxide in the organic/inorganic composite membranes are provided in FIG. 1.

As shown in FIG. 1, when titanium tetraisopropoxide is added as an inorganic particle precursor, the membrane including the titanium tetraisopropoxide has much higher water permeability over the entire concentration than the one including oxidation titanium nanoparticles as an inorganic particle. In particular, when the inorganic particles are included in a small amount of less than or equal to about 2.2 wt % in the entire organic/inorganic composite membrane, the organic/inorganic composite membrane has very high water uptake.

Experimental Example 3

Figure 2:
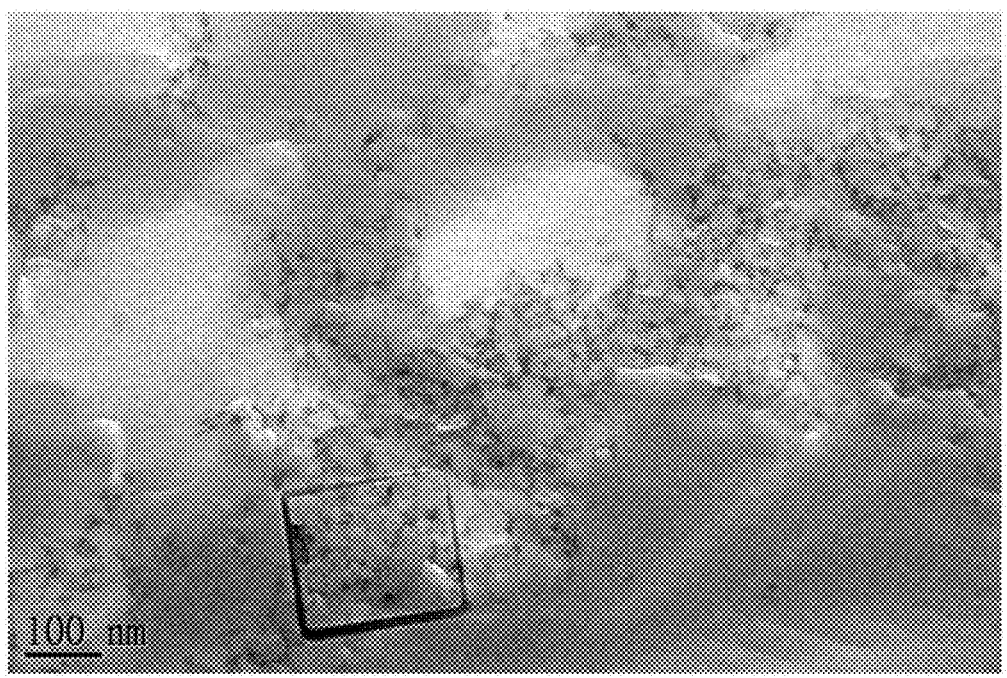
FIG. 2 is a transmission electron microscope image showing the cross-section of an organic/inorganic composite membrane according to Example 2.
Figure 3:
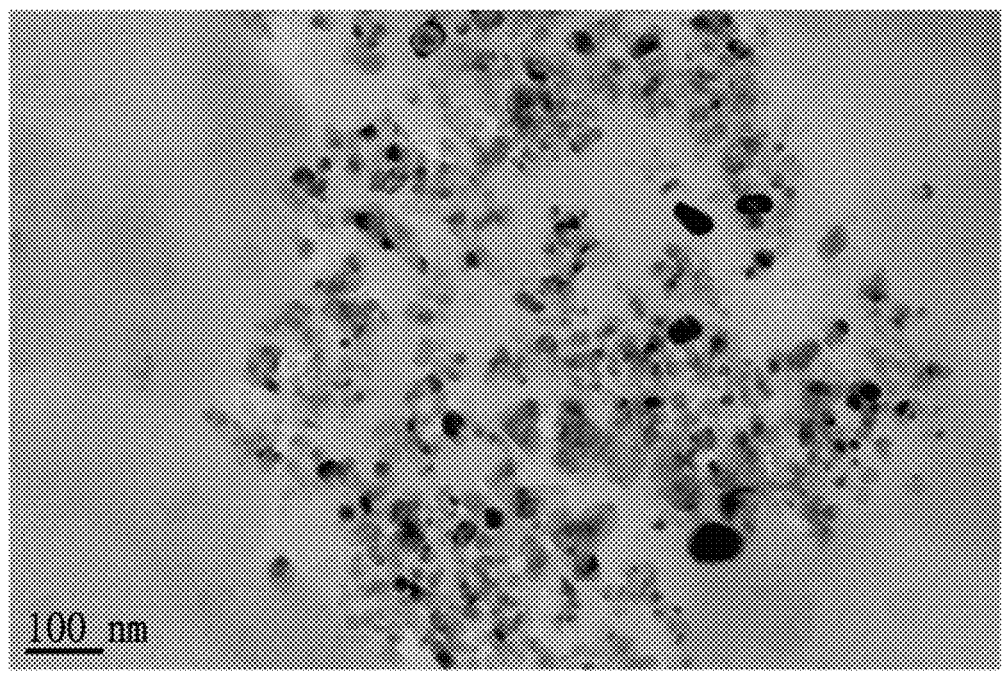
FIG. 3 is a transmission electron microscope image showing the cross-section of an organic/inorganic composite membrane according to Comparative Example 1.

Measurement of Size and Dispersion of Inorganic Particles in Organic/Inorganic Composite Membrane The organic/inorganic composite membranes according to Example 2 and Comparative Example 1 are examined regarding size and dispersion shape of the inorganic particles therein with a transmission electron microscope. The membranes are respectively fixed with epoxy and sliced into a thin film with a microtome. The thin film is examined with a transmission electron microscope. As shown in FIG. 2, the organic/inorganic composite membrane according to Example 2 includes about 10 nm inorganic particles uniformly dispersed therein. On the other hand, the organic/inorganic composite membrane according to Comparative Example 1 as shown in FIG. 3 includes about 20 to 50 nm particles entangled in an organic polymer matrix. Accordingly, the organic/inorganic composite membrane fabricated using a precursor includes smaller inorganic particles that are more evenly dispersed in an organic polymer matrix.

Experimental Example 4

Measurement of Finger-Like Structure of Organic/Inorganic Composite Membrane

Figure 4:
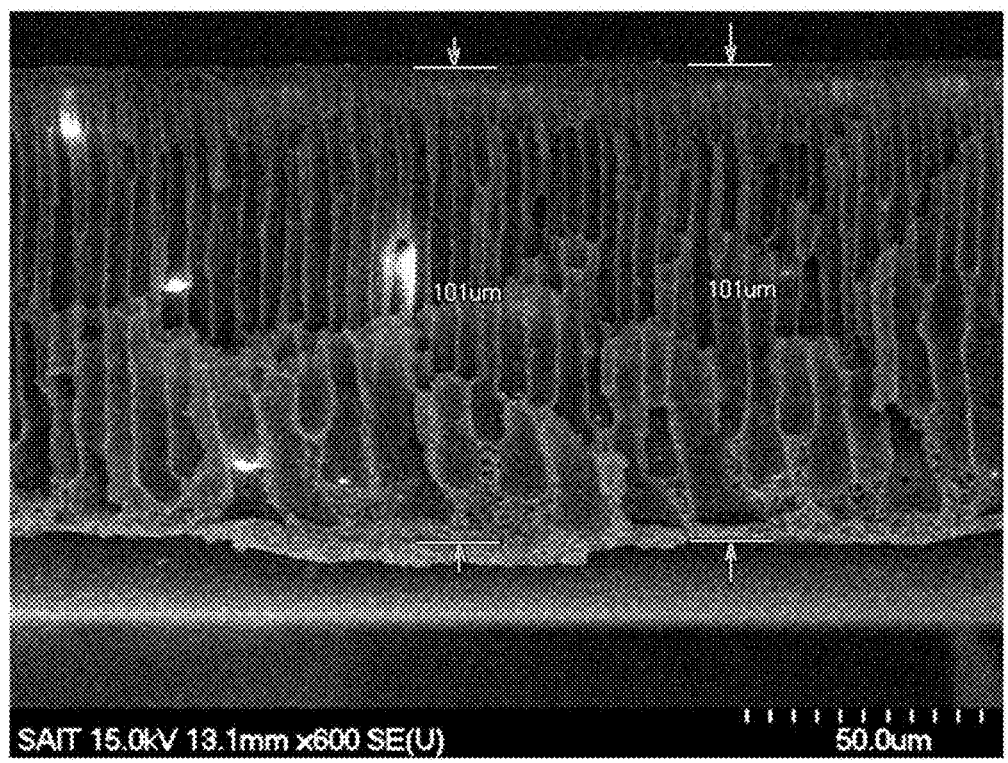
FIG. 4 is a scanning electron microscope image showing the cross-section of the organic/inorganic composite membrane according to Example 2.
Figure 5:
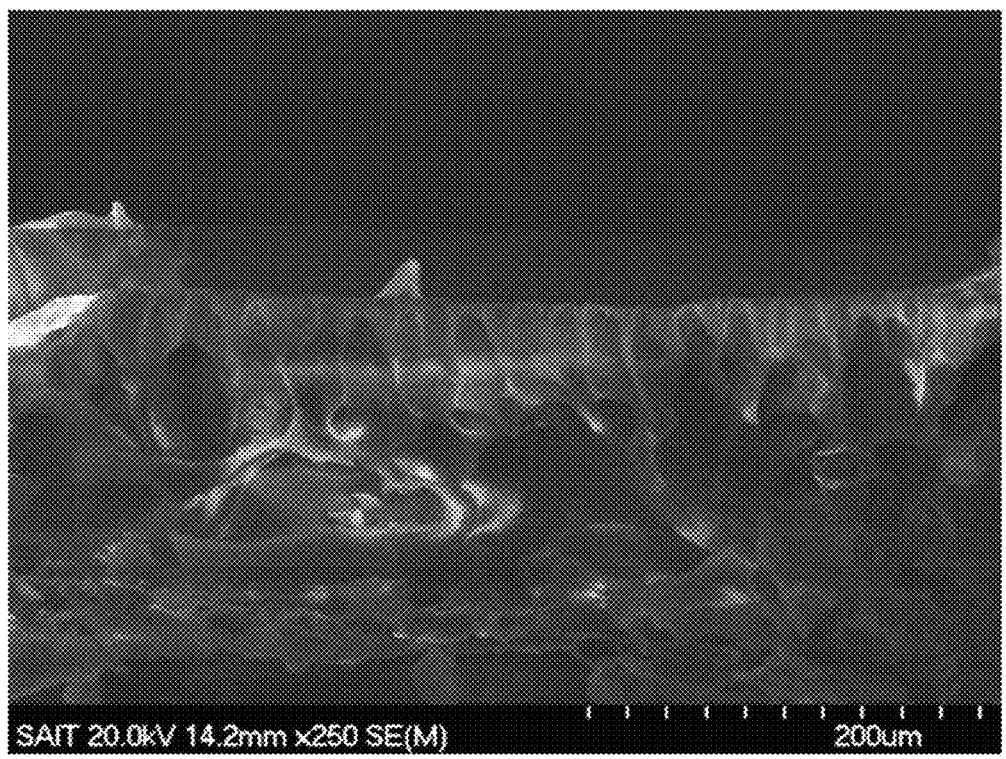
FIG. 5 is a scanning electron microscope image showing the cross-section of an organic/inorganic composite membrane according to Example 4.
Figure 6:
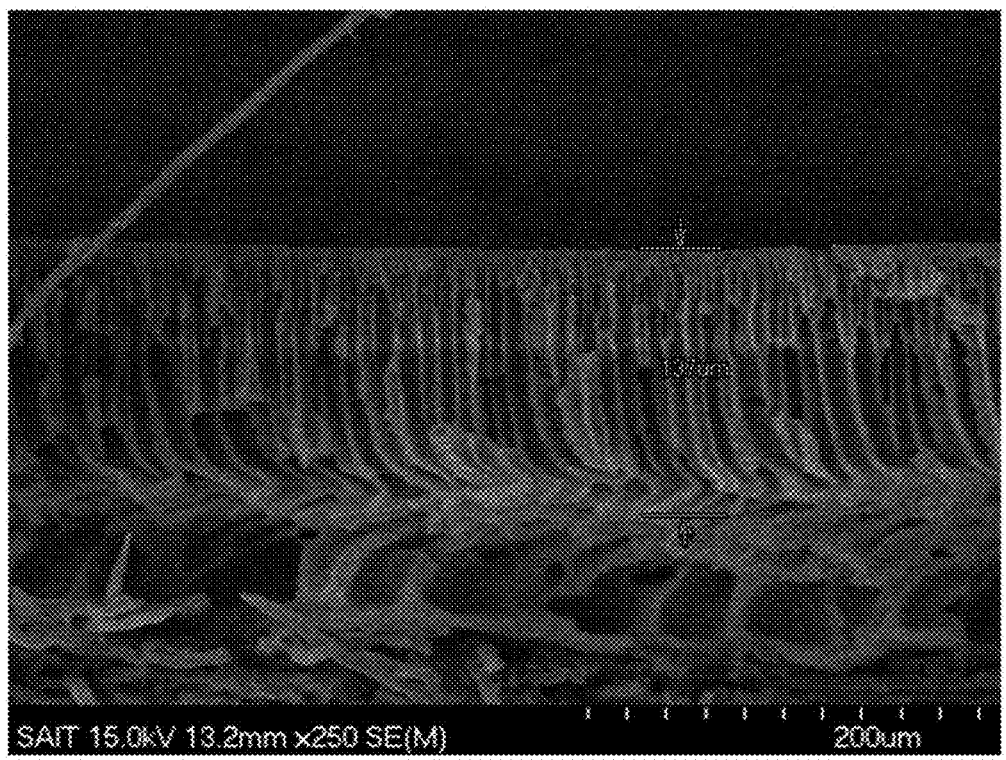
FIG. 6 is a scanning electron microscope image showing the cross-section of an organic/inorganic composite membrane according to Example 5.

The organic/inorganic composite membranes according to Examples 2, 4, and 5 are examined through a scanning electron microscope. As a result, a finger-like structure is identified therefrom (referring to FIGS. 4 to 6).

Experimental Example 5

Measurement of Concentration Distribution of Inorganic Particles in Organic/Inorganic Composite Membrane The organic/inorganic composite membranes according to Example 2 and Comparative Example 1 are examined regarding concentration distribution of inorganic particles therein over the entire membranes or from both surfaces thereof to about 10 nm deep using an atomic analyzer (EDAX, Energy Dispersive X-ray Spectroscopy). The results are respectively provided in the following Table 2 (the organic/inorganic composite membrane of Example 2) and Table 3 (the organic/inorganic composite membrane of Comparative Example 1).

TABLE 2

| Element | Membrane wt % | Membrane atom % | Up to about 10 nm depth from a surface having relatively higher density of a membrane wt % | Up to about 10 nm depth from a surface having relatively higher density of a membrane atom % | Up to about 10 nm depth from a surface having relatively lower density of a membrane wt % | Up to about 10 nm depth from a surface having relatively lower density of a membrane atom % |
|---|---|---|---|---|---|---|
| C | 74.26 | 82.81 | 67.97 | 79.28 | 75.13 | 84.30 |
| O | 15.56 | 13.03 | 16.12 | 14.12 | 12.71 | 10.71 |
| S | 9.52 | 3.98 | 13.53 | 5.91 | 11.33 | 4.76 |
| Ti | 0.67 | 0.19 | 2.38 | 0.69 | 0.82 | 0.23 |
| Total | 100.00 | | 100.00 | | 100.00 | |

TABLE 3

| Element | Membrane wt % | Membrane atom % | Up to about 10 nm depth from a surface having relatively higher density of a membrane wt % | Up to about 10 nm depth from a surface having relatively higher density of a membrane atom % | Up to about 10 nm depth from a surface having relatively lower density of a membrane wt % | Up to about 10 nm depth from a surface having relatively lower density of a membrane atom % |
|---|---|---|---|---|---|---|
| C | 69.95 | 79.56 | 74.90 | 85.04 | 75.03 | 85.02 |
| O | 18.21 | 15.55 | 10.18 | 8.68 | 10.66 | 9.07 |
| S | 10.70 | 4.56 | 14.47 | 6.15 | 13.16 | 5.58 |
| Ti | 1.14 | 0.32 | 0.46 | 0.13 | 1.15 | 0.33 |
| Total | 100.00 | | 100.00 | | 100.00 | |

As shown in Table 2, the amount of inorganic particles (Ti) in the organic/inorganic composite membrane according to Example 2 is 2.38 wt % from the surface having a higher density to about 10 nm deep, which is about three times that of the 0.82 wt % from the surface having a lower density to about 10 nm deep.

On the other hand, as shown in Table 3, the amount of inorganic particles (Ti) in the organic/inorganic composite membrane according to Comparative Example 1 is 0.46 wt % from the surface having a higher density to about 10 nm deep, which is about 0.39 times that of the 1.15 wt % from the surface having a lower density to about 10 nm deep.

Accordingly, the organic/inorganic composite membrane fabricated using an inorganic particle precursor has a much higher inorganic particle concentration on the surface having a higher density than the other surface having a lower density, while the organic/inorganic composite membrane fabricated using inorganic particles themselves has a much higher inorganic particle concentration on the surface having a lower density than the other surface having a higher density.

FIGS. 7 to 10 provide graphs showing inorganic particle concentrations on the surface having a higher density and the other surface having a lower density depending on depth of the membrane.

Figure 7:
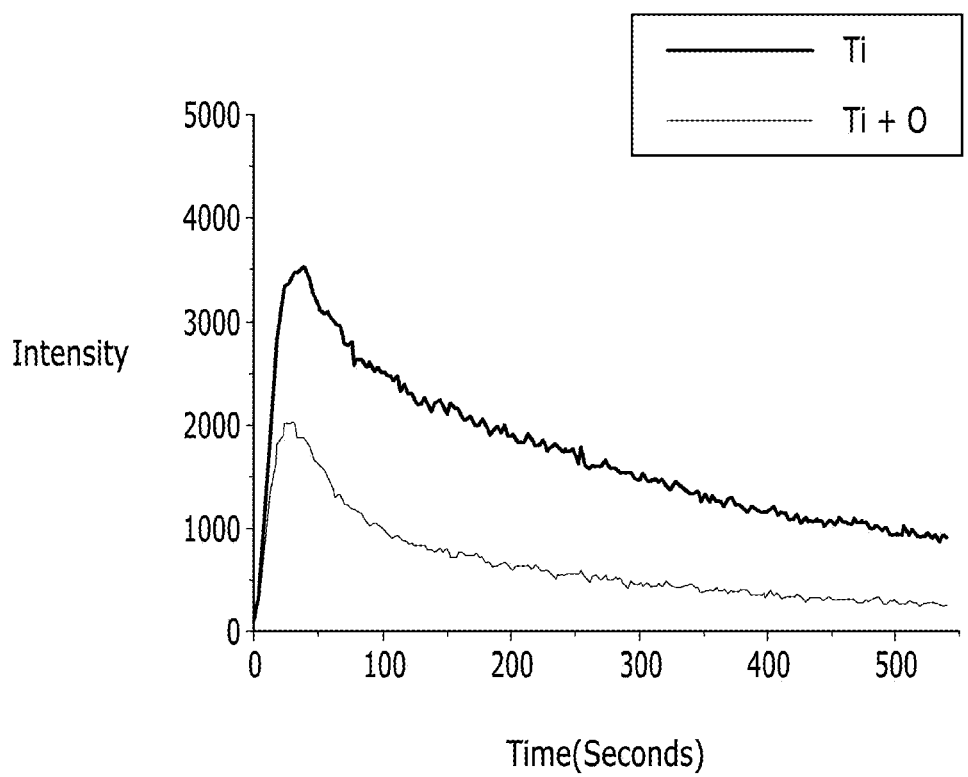
FIG. 7 is a graph showing Ti and Ti+O concentrations from a surface having a higher density toward a depth in a thickness direction in the organic/inorganic composite membrane according to Example 2.

FIG. 7 shows Ti and Ti+O concentrations from the surface having a higher density depending on depth in the organic/inorganic composite membrane according to Example 2. As shown in FIG. 7, the Ti and Ti+O concentrations are highest on the surface of the membrane having a higher density and became lower going deeper from the surface.

Figure 8:
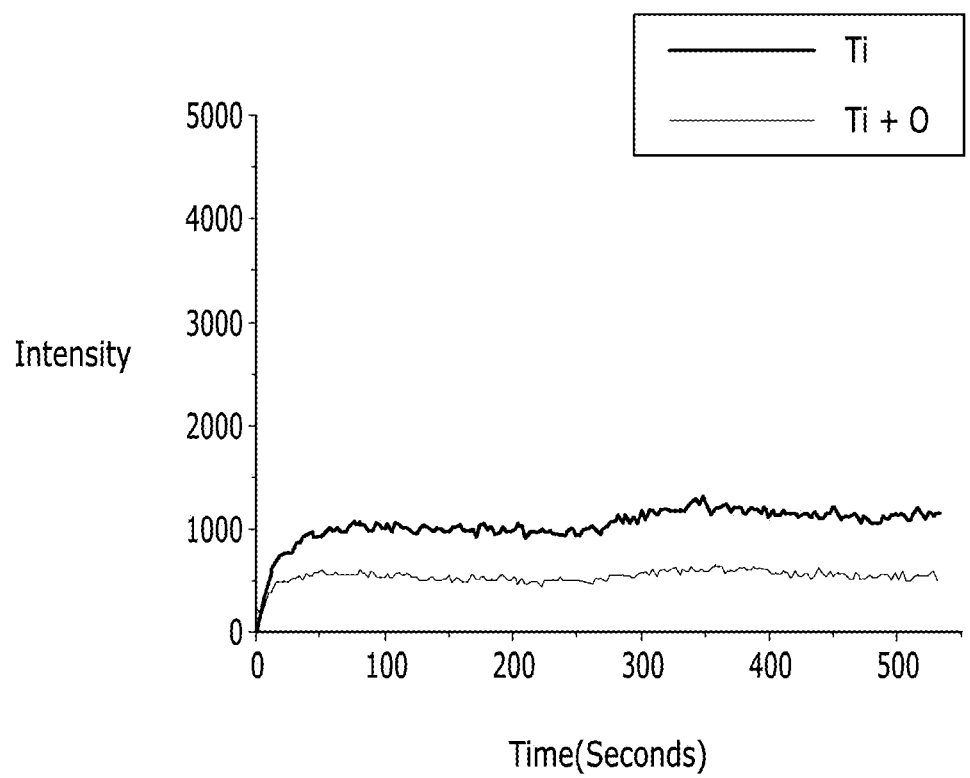
FIG. 8 is a graph showing Ti and Ti+O concentrations from the other surface having a lower density toward a depth in a thickness direction in the organic/inorganic composite membrane according to Example 2.

FIG. 8 shows Ti and Ti+O concentrations depending on depth from the surface having a lower density in the organic/inorganic composite membrane of Example 2. As shown in FIG. 8, the membrane has no Ti and Ti+O concentration change depending on depth from the surface having a lower density, and is about ⅓ lower than the Ti and Ti+O concentrations of FIG. 7.

Figure 9:
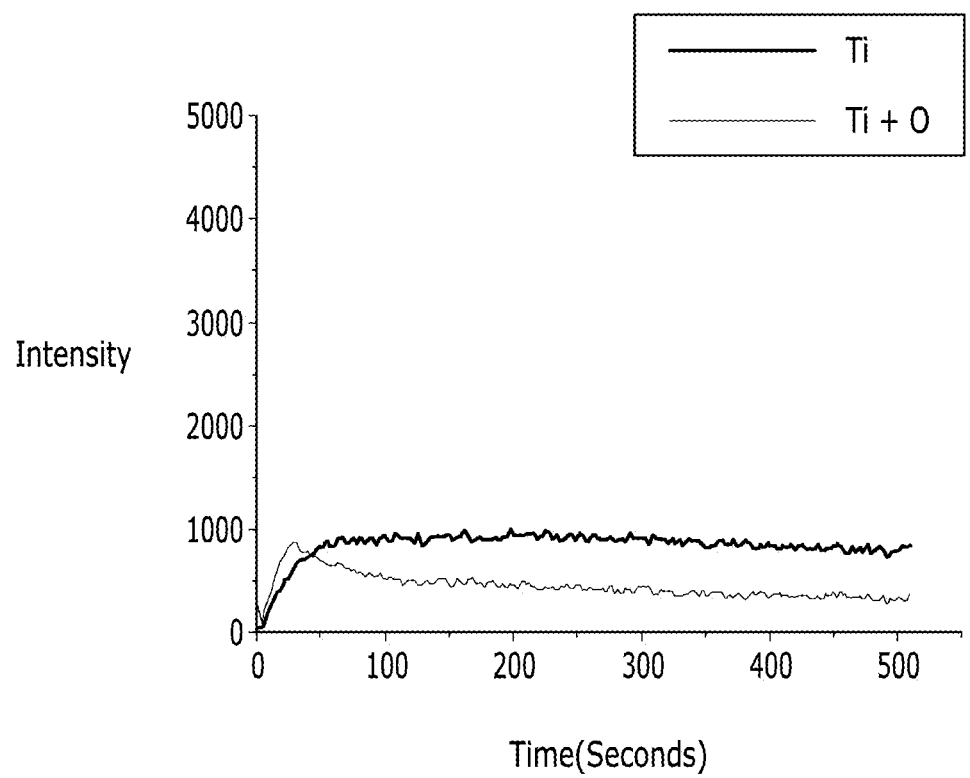
FIG. 9 is a graph showing Ti and Ti+O concentrations from the surface having a higher density toward a depth in a thickness direction in the organic/inorganic composite membrane according to Comparative Example 1.

FIG. 9 shows Ti and Ti+O concentrations depending on a depth from the surface having a higher density in the organic/inorganic composite membrane according to Comparative Example 1. As shown in FIG. 9, the membrane has almost no Ti and Ti+O concentration change on the surface having a higher density, and is about ⅓ lower than the Ti and Ti+O concentrations of FIG. 7.

Figure 10:
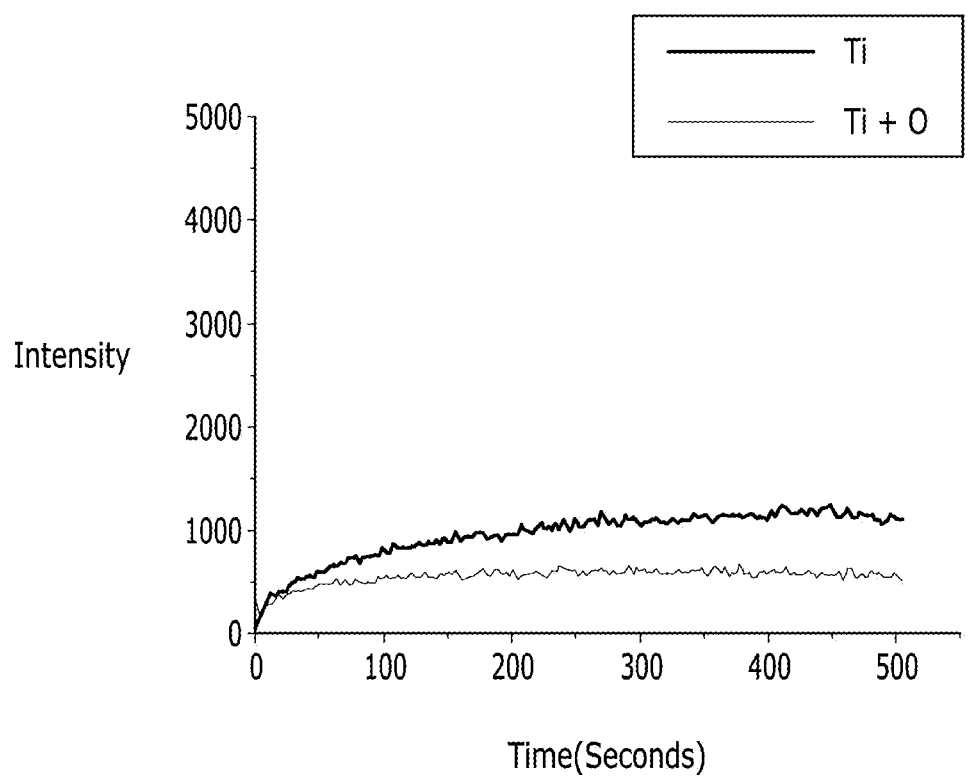
FIG. 10 is a graph showing Ti and Ti+O concentrations from the other surface having a lower density toward a depth in a thickness direction in the organic/inorganic composite membrane according to Comparative Example 1.

FIG. 10 shows Ti and Ti+O concentrations depending on depth from the surface having a lower density in the organic/inorganic composite membrane according to Comparative Example 1. As shown in FIG. 10, the membrane has almost no Ti and Ti+O concentration depending on depth on the surface having a lower density and higher Ti and Ti+O concentrations on the surface having a lower density than the other surface having a higher density compared with the membrane of FIG. 9.

The organic/inorganic composite membrane according to Example 3 is measured regarding silica inorganic particle concentration using an atomic analyzer (EDAX, Energy Dispersive X-ray Spectroscopy). The results are provided in the following Table 4.

TABLE 4

| Element | Membrane | |
|---|---|---|
| | wt % | atom % |
| C | 64.95 | 74.25 |
| O | 24.90 | 21.39 |
| S | 9.60 | 4.11 |
| Si | 0.55 | 0.25 |
| Total | 100.00 | |

As shown in Table 4, the silica inorganic particles are stably formed in an organic polymer matrix during fabrication of the organic/inorganic composite membrane according to Example 3.

Experimental Example 6

Fabrication of Separation Membrane, and Water Permeation Amount and Salt Reverse Permeation Amount of the Separation Membrane In order to measure forward osmosis performance of the organic/inorganic composite membranes according to Example 2 and Comparative Example 1, a polyamide active layer is introduced on the organic/inorganic composite membrane support layer through interface polymerization.

Specifically, the organic/inorganic composite membranes according to Example 2 and Comparative Example 1 are respectively dipped in an aqueous solution in which methylene diamine (MPD) is dissolved, so that the methylene diamine solution may be permeated into the organic/inorganic composite membranes. Then, the methylene diamine solution cast on the surface is removed with a roller, and the membrane is made to contact an organic solvent in which trimesoyl chloride (TMC) is dissolved to lead interface polymerization thereon for about one minute.

After removing amine and chloride remaining thereon, the membrane is washed with flowing water for greater than or equal to about 30 minutes to remove an unreacted material and a byproduct. Then, the obtained separation membrane including an organic/inorganic composite support layer/polyamide active layer is isolated from light and stored in a refrigerator.

In addition, a separation membrane as a control group is fabricated according to the same method as above by interface-polymerizing a polyamide active layer on a polysulfone membrane including no inorganic particles prepared in Comparative Example 2.

The obtained separation membrane is measured regarding water permeation amount and salt reverse permeation amount. The results are provided in FIG. 11. The measurements are performed under the following conditions. Specifically, the measurements are performed using deionized water as a feed solution and 1.5 M salt water as a draw solution at room temperature of 25° C. at a crossflow rate of 10.7 cm/s.

Figure 11:
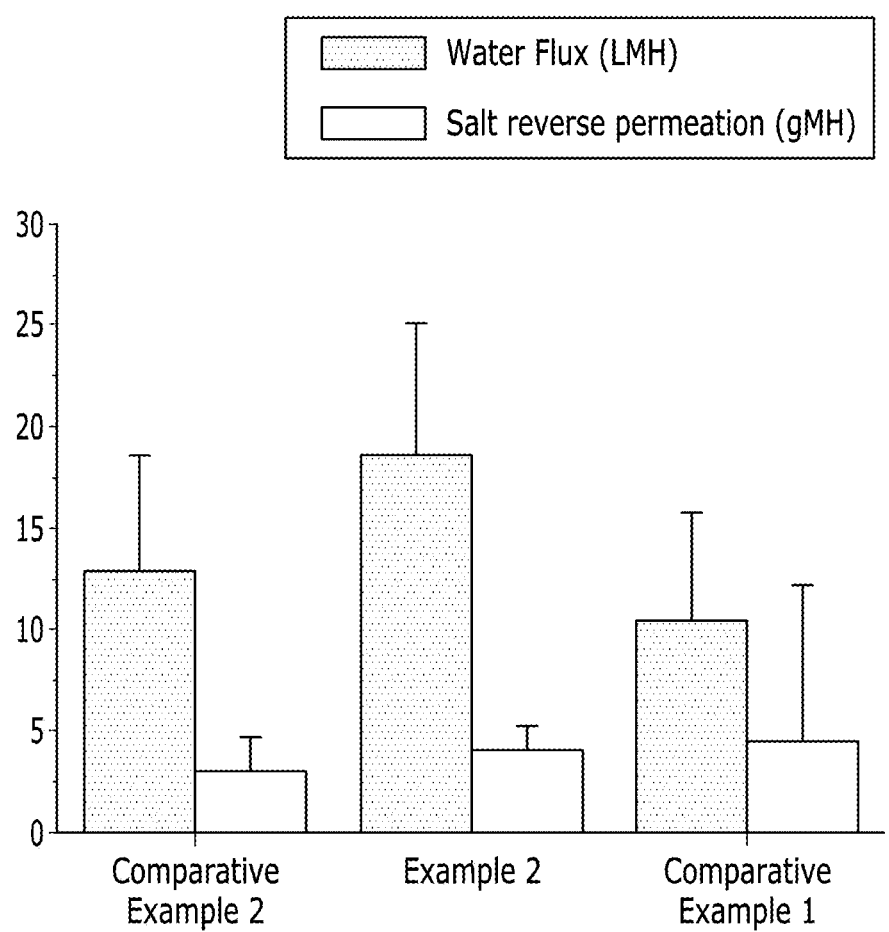
FIG. 11 is a graph showing water permeation amount and salt reverse permeation amount of each separation membrane fabricated by respectively using the organic/inorganic composite membranes according to Example 2 and Comparative Example 1 to evaluate the forward osmosis performance thereof.
Figure 12:
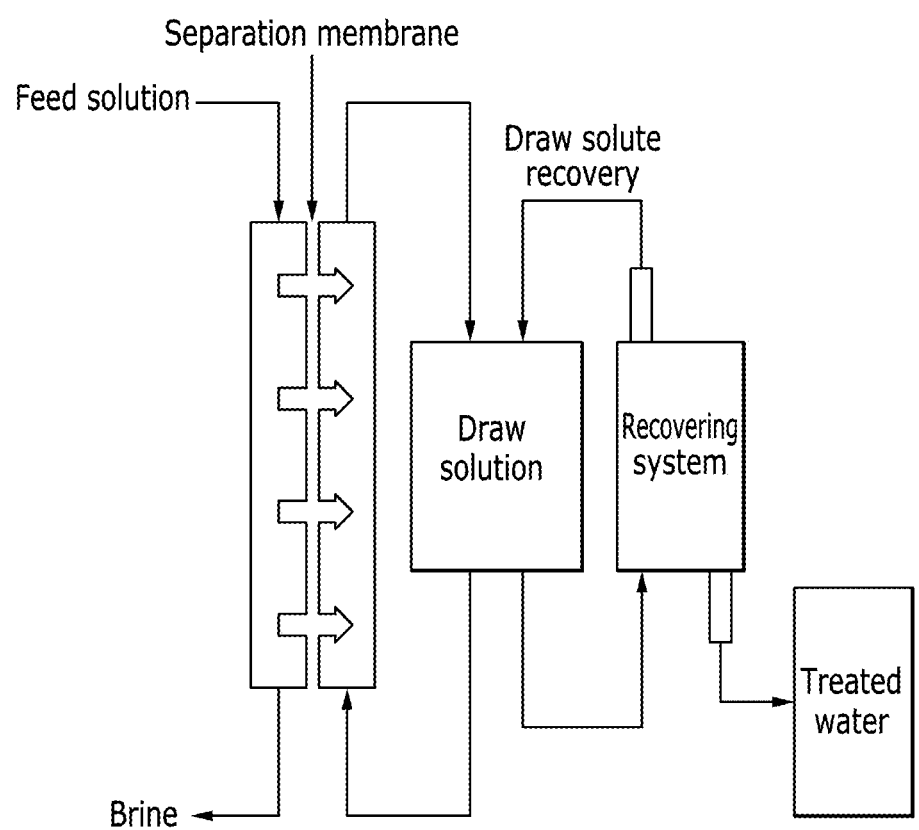
FIG. 12 is the schematic view of a forward osmosis water treatment device according to one example embodiment.

As shown in FIG. 11, the separation membrane including the organic/inorganic composite membrane according to Example 2 has the highest water permeation amount, while the separation membrane including the organic/inorganic composite membrane according to Comparative Example 1 has a lower water permeation amount than the polysulfone separation membrane according to Comparative Example 2 as a control group.

As for the salt reverse permeation amount, the separation membrane according to Comparative Example 2 has the lowest amount, while the separation membrane including the organic/inorganic composite membrane according to Comparative Example 1 has the highest amount. Accordingly, the salt reverse permeation amount is related to non-uniformity (defects) of the separation membrane during the separation membrane synthesis.

As aforementioned, according to one example embodiment, an organic/inorganic composite membrane is fabricated by introducing an inorganic particle precursor into a polymer solution and simultaneously forming a polymer membrane and inorganic particles through non-solvent phase inversion. When the organic/inorganic composite membrane is used as a support layer of the separation membrane for water treatment, the organic/inorganic composite membrane becomes more hydrophilic than an organic/inorganic composite membrane prepared by adding inorganic particles themselves to the polymer solution, and has remarkably increased water uptake despite a low inorganic amount. In addition, the organic/inorganic composite membrane has decreased non-uniformity (defects) compared with the one prepared by adding inorganic particles themselves to the polymer solution. Based on the results, when a forward osmosis (FO) performance test is performed by using the organic/inorganic composite membrane as a support layer and interface-polymerizing a polyamide active layer thereon, the organic/inorganic composite membrane according to one example embodiment has a greater forward osmosis amount than a membrane including only a polymer or the organic/inorganic composite membrane prepared by adding inorganic particles themselves to the polymer solution. Accordingly, the organic/inorganic composite membrane according to example embodiments may accomplish a higher energy efficiency when used for a forward osmosis water treatment device.

While various examples have been described herein, it is to be understood that the present disclosure is not limited to the disclosed embodiments. On the contrary, the present disclosure is intended to cover all applicable modifications and equivalent arrangements included within the spirit and scope of the appended claims.

What is claimed is:

1. An organic/inorganic composite membrane comprising:
   an organic polymer matrix defining finger-like pores therein, the organic polymer matrix having a first surface on a side of the membrane and an opposing second surface on a second side of the membrane, the first surface being denser than the opposing second surface;
   hydrophilic inorganic particles dispersed in the organic polymer matrix, the first surface having a higher concentration of the hydrophilic inorganic particles than the opposing second surface, the hydrophilic inorganic particles formed from a hydrophilic inorganic particle precursor provided in a polymer solution for forming the organic polymer matrix,
   wherein a first under-region of the first surface has more than 1 times a concentration of the hydrophilic inorganic particles than a second under-region of the opposing second surface, the first under-region of the first surface extending to a first depth of 0.0005% to about 0.05% of an overall thickness of the organic/inorganic composite membrane, the second under-region of the opposing second surface extending to a second depth of 0.0005% to about 0.05% of the overall thickness of the organic/inorganic composite membrane.

2. The organic/inorganic composite membrane of claim 1, wherein the first under-region of the first surface has at least about 2 times a concentration of the hydrophilic inorganic particles than the second under-region of the opposing second surface.

3. The organic/inorganic composite membrane of claim 1, wherein the first under-region of the first surface has at least about 2.5 times a concentration of the hydrophilic inorganic particles than the second under-region of the opposing second surface.

4. The organic/inorganic composite membrane of claim 1, wherein the first under-region of the first surface has at least about 3 times a concentration of the hydrophilic inorganic particles than the second under-region of the opposing second surface.

5. The organic/inorganic composite membrane of claim 1, wherein the organic polymer matrix includes a polymer selected from polysulfone, polyethersulfone, polyphenylsulfone, polyetherethersulfone, polyetherketone, polyetheretherketone, polyphenylene ether, polydiphenylphenylene ether, polyvinylene cellulose acetate, cellulose diacetate, cellulose triacetate, and polyphenylene sulfide.

6. The organic/inorganic composite membrane of claim 1, wherein the hydrophilic inorganic particles include an oxide or hydroxide of Ti, Al, Zr, Si, Sn, B, or Ce.

7. The organic/inorganic composite membrane of claim 1, wherein the hydrophilic inorganic particles have an average particle size of about 20 nm or less.

8. The organic/inorganic composite membrane of claim 1, wherein the hydrophilic inorganic particles have an average particle size of about 15 nm or less.

9. The organic/inorganic composite membrane of claim 1, wherein the hydrophilic inorganic particles are present in an amount of about 0.1 wt % to about 20.0 wt % based on a total weight of the organic/inorganic composite membrane.

10. A separation membrane for water treatment comprising the organic/inorganic composite membrane according to claim 1.

11. The separation membrane of claim 10, further comprising:
   an active layer on the first surface of the organic/inorganic composite membrane, the active layer formed of a polymer matrix configured to permeate water but not a subject material to be separated.

12. The separation membrane of claim 11, wherein the polymer matrix includes polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylidene fluoride, polyvinyl chloride, cellulose acetate, cellulose diacetate, or cellulose triacetate.

13. The separation membrane of claim 11, wherein the active layer is interface-polymerized on the first surface of the organic/inorganic composite membrane.

14. A water treatment device comprising the separation membrane according to claim 10.

15. The water treatment device of claim 14, wherein the water treatment device is a forward osmosis water treatment device or a reverse osmosis water treatment device.

16. A method of manufacturing an organic/inorganic composite membrane, comprising:
   dissolving an organic polymer and a hydrophilic inorganic particle precursor in an organic solvent to form a resultant solution;
   casting the resultant solution on a supporter to form a cast structure; and
   dipping the cast structure in water to initiate a non-solvent phase inversion to form hydrophilic inorganic particles dispersed in an organic polymer matrix, a first surface of the organic polymer matrix having a higher concentration of the hydrophilic inorganic particles than an opposing second surface.

17. The method of claim 16, wherein the dissolving includes the hydrophilic inorganic particle precursor being an alkoxide, ester, acetylacetonate, halide, or nitride of a Ti, Al, Zr, Si, Sn, B, or Ce.

18. The method of claim 16, wherein the dissolving includes the organic polymer being polysulfone, polyethersulfone, polyphenylsulfone, polyetherethersulfone, polyetherketone, polyetheretherketone, polyphenylene ether, polydiphenylphenylene ether, polyphenylene sulfide, cellulose acetate, cellulose diacetate, or cellulose triacetate.

19. The method of claim 16, wherein the dissolving includes the organic solvent being at least one of acetone; acids selected from acetic acid and trifluoroacetic acid (TFA); alcohols selected from methanol, isopropanol, 1-methoxy-2-propanol, ethanol, and terpineol; oxygen-containing cyclic compounds selected from tetrahydrofuran (THF), 1,4-dioxane, and sulfolane; aromatic compounds including a heteroatom of N, O, or S selected from pyridine and the like; halogen compounds selected from chloroform and methylene chloride; aprotic polar compounds selected from dimethyl formamide (DMF), dimethyl acetamide (DMAC), dimethylsulfoxide (DMSO), and N-methyl-2-pyrrolidone (NMP); and acetates selected from 2-butoxyethylacetate and 2(2-butoxyethoxy)ethylacetate.

* * * * *